United States Patent [19]

Ogawa et al.

[11] Patent Number: 4,466,401
[45] Date of Patent: Aug. 21, 1984

[54] INTERNAL COMBUSTION ENGINE WITH BEARING BEAM STRUCTURE

[75] Inventors: Naoki Ogawa; Kazuyuki Fujigaya, both of Yokosuka, Japan

[73] Assignee: Nissan Motor Company, Limited, Yokohama, Japan

[21] Appl. No.: 338,517

[22] Filed: Jan. 11, 1982

[30] Foreign Application Priority Data

Jan. 19, 1981 [JP] Japan .................... 56-5541[U]

[51] Int. Cl.³ .................. F16F 15/00; F02F 1/00
[52] U.S. Cl. .................. 123/195 H; 123/195 R; 123/198 E
[58] Field of Search ........... 123/195 R, 195 C, 195 H, 123/198 E, 196 R

[56] References Cited

U.S. PATENT DOCUMENTS

| 4,199,202 | 4/1980 | Maeda | 123/196 R |
| 4,213,440 | 6/1980 | Abe et al. | 123/198 E |
| 4,245,595 | 1/1981 | Abe et al. | 123/195 C |

FOREIGN PATENT DOCUMENTS

| 472638 | 4/1947 | Belgium . |
| 7215920 | 12/1972 | France . |
| 695554 | 8/1953 | United Kingdom . |
| 1294766 | 11/1972 | United Kingdom . |
| 2008195 | 5/1979 | United Kingdom . |

OTHER PUBLICATIONS

MTZ Motortechnische Zeitschrift, vol. 38, Jul.–Aug. 1977, pp. 289–291, K. Schellmann et al.

Primary Examiner—Craig R. Feinberg
Assistant Examiner—David A. Okonsky
Attorney, Agent, or Firm—Schwartz, Jeffery, Schwaab, Mack, Blumenthal & Koch

[57] ABSTRACT

An internal combustion engine comprises a cylinder block including a skirt section, and a plurality of bearing sections connected to the skirt section; and a bearing beam structure secured to the bottom part of the cylinder block and including a plurality of main bearing cap sections each associating with each cylinder block bearing section to rotatably support a crankshaft, first and second beam sections disposed to connect the main bearing cap sections with each other, and first and second side wall sections disposed to securely connect the bearing cap sections with each other respectively at their one of opposite side portions and at the other one of the opposite side portions, each side wall section being securely connected at its lower part with each beam section and the its top part with the lower part of the cylinder block skirt section, thereby greatly improving the rigidity of the entire bearing beam structure, thereby effectively suppressing noise emission from the cylinder block.

7 Claims, 9 Drawing Figures

INTERNAL COMBUSTION ENGINE WITH BEARING BEAM STRUCTURE

BACKGROUND OF THE INVENTION

1. Field of the Invention

This invention relates to a low noise level automotive internal combustion engine, and more particularly to an engine equipped with a bearing beam structure for supporting a crankshaft in a manner to improve the mechanical strength of a cylinder block.

2. Description of the Prior Art

In connection with engine noise, noise emitted from a cylinder block skirt section and an oil pan is mainly caused by the vibration of the cylinder block itself. In order to reduce such vibration noise, it would appear sufficient to suppress the vibration, due to explosion torque, applied to a crankshaft by increasing the rigidity of the cylinder block. However, this unavoidably leads to an increase in cylinder block wall thickness and accordingly to a great increase in engine weight, thereby giving rise to new problems such as reduced fuel economy. In view of this, a variety of propositions have been made to improve the rigidity of the cylinder block while suppressing the increase in cylinder block weight. Of these propositions, attention has been paid to the employment of a bearing beam structure which securely connects a plurality of bearing caps for supporting the crankshaft, in order to improve the mechanical strength of bearing caps and engine parts associated with them.

BRIEF SUMMARY OF THE INVENTION

In accordance with the present invention, an internal combustion engine comprises a cylinder block including a skirt section, and a plurality of bearing sections integrally connected to the skirt section. A bearing beam structure is secured to the bottom part of the cylinder block and includes a plurality of main bearing cap sections each of which associates with a cylinder block bearing section to rotatably support the journal of a crankshaft. First and second beam sections are disposed to securely connect the main bearing cap sections with each other. The first and second beam sections extend parallel with the axis of the crankshaft and are located spacedly along the respective opposite side portions of each bearing beam cap section. Additionally, first and second side wall sections are disposed to securely connect the bearing cap sections with each other respectively at their one of opposite side portions and at the other one of the opposite side portions. The first side wall section is securely connected at its bottom part with the first beam section and connected at its top part with the lower part the cylinder block skirt section. The second side wall section is arranged in the same manner as in the first side wall section.

With the thus arranged engine, the bearing cap sections and the cylinder block bearing bulkheads are improved in their strength against torsional and flexural vibration, which effectively suppresses the vibration of the cylinder block skirt section and accordingly of an oil pan. Accordingly, the rigidity of the bearing beam structure is greatly improved to supress the pitching movement thereof, thereby effectively decreasing noise emission from the cylinder block.

BRIEF DESCRIPTION OF THE DRAWINGS

The features and advantages of the internal combustion engine according to the present invention will be more appreciated from the following description taken in conjunction with the accompanying drawings in which like reference numerals and characters designate like parts and elements, in which.

DETAILED DESCRIPTION OF THE INVENTION

Figure 1:
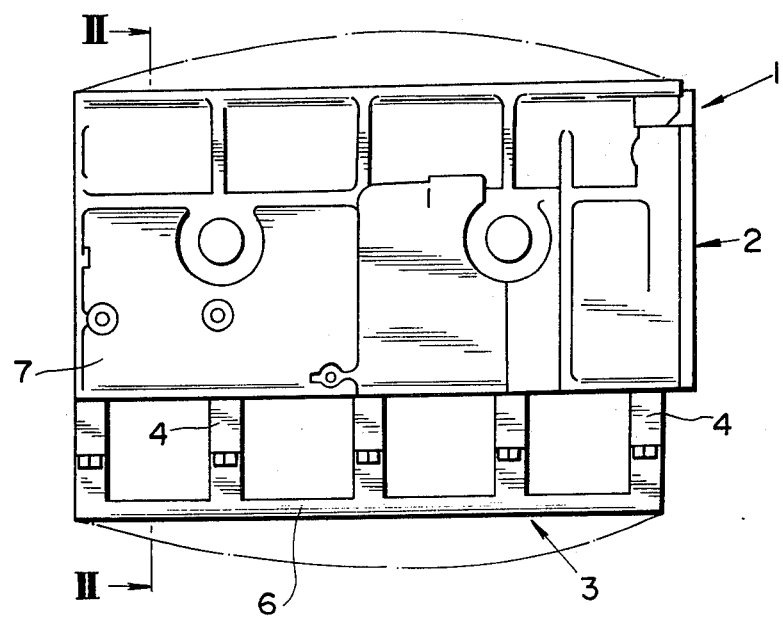
FIG. 1 is a front elevation of a conventional internal combustion engine.
Figure 2:
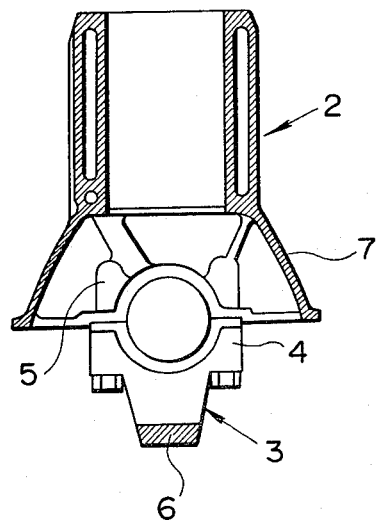
FIG. 2 is a vertical sectional view taken in the direction of arrows substantially along the line II—II of FIG. 1.
Figure 3:
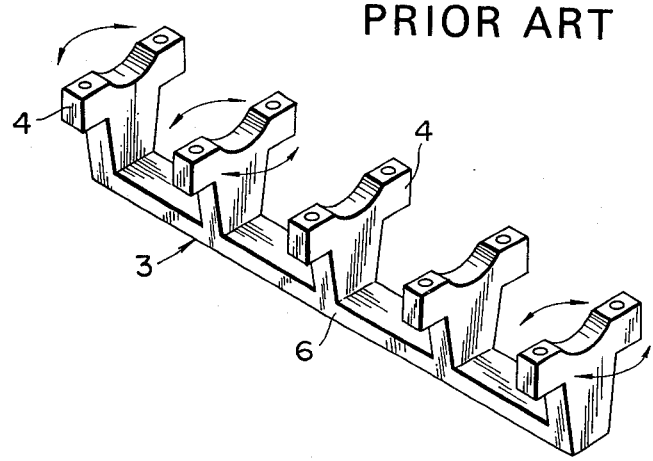
FIG. 3 is a perspective view of a conventional bearing beam structure used in the engine of FIG. 1.

To facilitate understanding the invention, a brief reference will be made to an engine block 1 of a conventional automotive internal combustion engine, depicted in FIGS. 1 to 3. Referring to FIGS. 1 and 2, the engine block 1 includes a cylinder block 2, and a bearing beam structure 3 secured to the bottom part of the cylinder block 2 by means of bolts. The bearing beam structure 3 has a plurality of main bearing cap sections 4 each of which associates with each of bearing sections 5 or main bearing bulkheads of the cylinder block 2, as shown in FIG. 3. The thus associated bearing cap section 4 and cylinder block bearing section 5 rotatably support the journal of a crankshaft (not shown). The bearing cap sections 4 are securely or integrally connected with each other through a beam section 6 extending along the axis of the crankshaft, so that the rigidity of the engine block 1 can be increased. Therefore, the engine block 1 is considerably improved in flexural rigidity against the flexural vibration indicated in phantom in FIG. 1 and against the vibration of the bearing cap sections 4 in the axial direction of the crankshaft or the forward-and-rearward direction which vibration so acts on each bearing cap section as to cause it to come down.

However, with the above-mentioned arrangement, although the flexural rigidity of the engine block 1 is increased in the direction perpendicular to the crankshaft axis, a desired low level of engine noise cannot be attained because of mere contribution to slightly raising the resonance frequency of the cylinder block.

Furthermore, even if each main bearing cap section 4 is prevented from the vibration in the forward-and-rearward direction to cause it to come down, it is not effective for suppressing the vibration of a cylinder block skirt section 7, bulged outwardly to define thereinside the upper section of a crankcase (not identified), in the lateral direction or open-and-close movement direction. Accordingly, the above-mentioned arrangement is not so effective for preventing noise generation from the skirt section 7 and an oil pan (not shown) securely attached to the bottom edge of the skirt section 7.

It has been also revealed that the lateral vibration of the cylinder block skirt section 7 is induced by the movements of bearing cap sections 4 and the bearing bulkheads 5 due to their torsional vibration around the crankshaft axis and flexural vibration in the right-and-left direction as viewed in plan or in the direction indicated by arrows in FIG. 3. Such movements are combined with each other and excite the vibration of the cylinder block skirt section 7 and the oil pan. In order to suppress such vibrations, the above-mentioned conventional bearing beam structure 3 is not so effective and therefore is low in noise reduction effect for the weight increase thereof.

Figure 4:
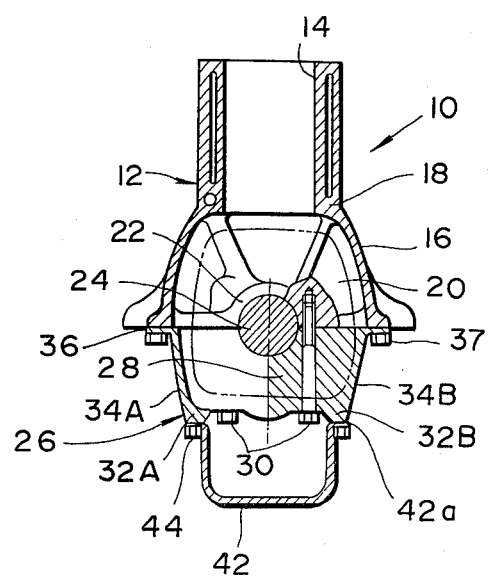
FIG. 4 is a vertical sectional view of a preferred embodiment of an internal combustion engine in accordance with the present invention.
Figure 5A:
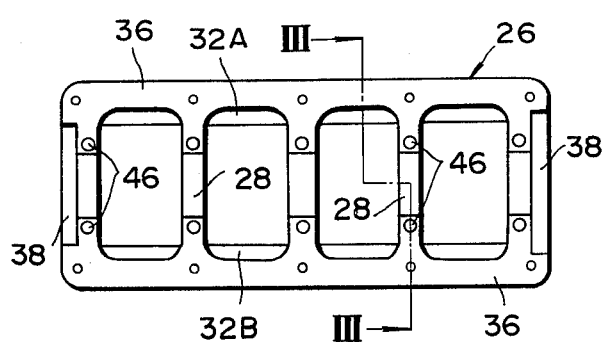
FIGS. 5A, 5B, 5C, 5D are plan view, front view, bottom view, right-side view, respectively, of a bearing beam structure used in the engine of FIG. 4.
Figure 5D:
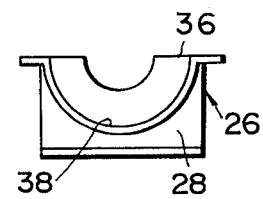
Figure 5B:
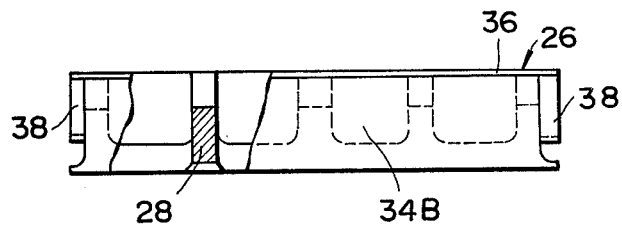
Figure 5E:
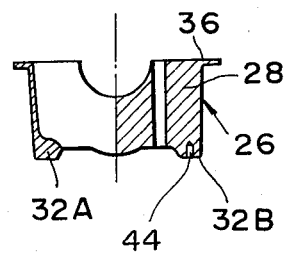
FIG. 5E is a cross-sectional view taken in the direction of arrows substantially along the line III—III of FIG. 5A.

In view of the above description of the automotive internal combustion engine provided with the conventional bearing beam structure, reference is now made to FIGS. 4 to 5E, wherein a preferred embodiment of an internal combustion engine of the present invention is illustrated by the reference numeral 10. The engine 10 in this embodiment is for an automotive vehicle and comprises a cylinder block 12 which is formed with a plurality of cylinder barrels 14 each of which defines therein a cylinder bore (no numeral). The cylinder block 12 includes a skirt section 16 which is bulged outwardly and extends downwardly to define thereinside an upper part of a crankcase (no numeral). The skirt section 16 is integrally connected through a lower block deck 18 with the cylinder barrels 14. A plurality of main bearing bulkheads 20 are aligned parallel with each other and located inside the skirt section 16. Each bearing bulkhead 20 is located below and connected to a portion between the adjacent two cylinder barrels 14. The bearing bulkhead 20 is integrally connected at its top part with the lower block deck 18 and at its side parts with the inner wall of the skirt section 16. Each bearing bulkhead 20 is provided at its bottom central portion with a bearing section 22 for rotatably receiving the journal of crankshaft 24.

A bearing beam structure 26 is securely connected to the bottom section of the cylinder block 12 and includes a plurality of main bearing cap sections 28. Each bearing cap section 28 is secured onto a bearing bulkhead 20 by means of cap bolts 30 so as to associate with the bearing section 22 of the bearing bulkhead 20, thereby rotatably supporting the journal of the crankshaft 24. In this instance, the bearing cap section 28 is formed in the shape of an isosceles trapezoid whose top side is longer than the bottom side. The wide of the top part of the bearing cap section 28 generally corresponds to that of the bottom widened part of the skirt section 16.

The bearing cap sections 28 are integrally connected with each other through two elongate beam sections 32A and 32B which are located parallel with the axis of the crankshaft 24. The two beam sections 32A, 32B are positioned respectively along the bottom opposite corners of the bearing cap sections 28. Additionally, the beam sections 32A, 32B are located symmetrical with each other with respect to a vertical plane (not shown) containing the crankshaft axis and parallel with the axes of the cylinder bores.

Furthermore, two side wall sections 34A and 34B are provided to form opposite side walls of the bearing beam structure 26. The side wall section 34A integrally connects the bearing cap sections 28 with each other at one of their opposite side portions, whereas the side wall section 34B integrally connects the bearing cap sections 28 with each other at their other opposite side portions. These side wall sections 34A, 34B extend parallel with the crankshaft axis from the front end to the rear end of the bearing beam structure 26. The side wall section 34A is integrally connected at its bottom part with the beam section 32A and formed at its top part with a flange 36 which is securely connected to the bottom flange of the skirt section 16 by means of bolts 37. The side wall section 34B is constructed and arranged in the same manner as in the side wall section 34A. Additionally, the front-most and rear-most bearing cap sections 28 are formed at their out side surface with oil seal installation portions 38 each of which supports or carries an oil seal for the crankshaft 24. It will be appreciated in this instance, that the side wall sections 34A, 34B are cast integrally with the beam sections 32A, 32B, the bearing cap sections 28, and also with the oil seal installation portions 38, in order to form an one-piece bearing beam structure 26 by using as the material a light alloy such as aluminum alloy. It will be understood that these side wall sections 34A, 34B are formed outside of the envelope M of the outer-most loci of the big end of a connecting rod (not shown).

Figure 5C:
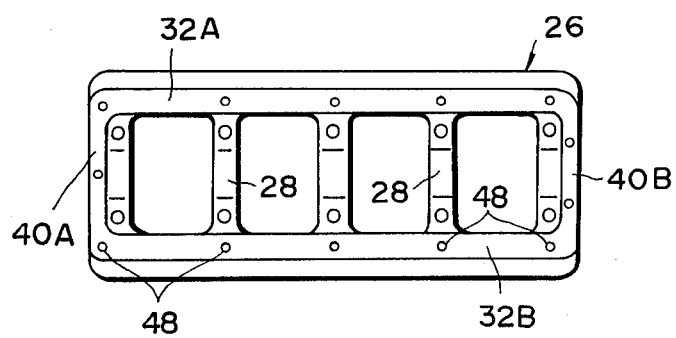

As best shown in FIG. 5C, the two beam sections 32A, 32B are connected at their front end portions with each other by a front connecting section 40A, and at their rear end portion with each other by a rear connecting section 40B, thereby forming a continuous and integral frame-like bottom surface (no numeral) to which the flange 42a of an oil pan 42 is securely connected by means of bolts 44. It is to be noted in this instance, that the hollow inside of the bearing beam structure 26 may serve as a part of an oil reservoir and therefore it is sufficient that the oil pan 42 is of the small size. As shown in FIGS. 5A and 5C, the bearing beam structure 26 is formed with a plurality of holes 46 for receiving the cap bolts 30, and a plurality of holes 48 for receiving the bolts 44 for oil pan installation.

With the thus arranged engine, by virtue of the two beam sections 32A, 32B, the bearing cap sections 28 are improved in strength against the vibration applied in the crankshaft axis direction to cause them to come down, and in torsional strength around the crankshaft axis. Additionally, the bearing cap sections 28 can be increased in flexural strength around the axis of cylinder bore. Furthermore, the bearing cap sections 28 are integrally connected at its side portion with each other by means of the side wall sections 34A, 34B, and are rigidly connected through these side wall sections 34A, 34B with the bottom part of the cylinder block skirt section 16. Therefore, the bearing cap sections 28 are increased in strength against the separating movement of the adjacent bearing cap sections 28. Besides, the bearing beam structure 26 is improved in rigidity as a whole. As a result, the beam sections 32A, 32B of the bearing beam structure 26 and the bearing section 22 of the cylinder block 12 are effectively suppressed in their pitching movement or generally vertical movement. Thus, the suppressing effect, due to the beam sections 32A, 32B, against the torsional vibration and the flexural vibrations in the lateral and vertical directions of the cylinder block 12, particularly at the bearing section 22, is made most effective.

In this embodiment, since the small sized oil pan 42 is attached to the bottom surface of the bearing beam structure 26, whose inside forms a part of the oil reservoir, the outer surface area of the oil pan 42 can be decreased without decreasing the oil amount. Thus, an increase in the oil pan rigidity is achieved as well as a decrease in the noise generating surface area of the oil pan, from a standpoint of decreasing membrane vibration. It is to be noted that the outer surface of the side wall sections 34A, 34B is much higher in rigidity than that of conventional oil pans, and accordingly the noise level emitted from the surface of the side wall sections 34A, 34B is considerably low as compared with that from the conventional oil pan surface, thereby greatly contributing to total noise reduction of the engine. Moreover, since the bearing beam structure 26 is formed integrally with the crankshaft oil seal installation portions 38, the seal structure for the crankshaft becomes simple and compact, thereby decreasing the number of parts and simplifying assembly process. This leads to lowering in production cost.

As is appreciated from the above, according to the present invention, the bearing cap sections are fixedly connected with each other at their bottom part by means of the beam sections. This can effectively increase the rigidity against the torsional vibration and flexural vibration in the lateral direction applied to the bearing cap sections and the bearing bulkheads. As a result, the open-and-close movement vibration (membrane vibration) of the cylinder block skirt section can be reliably and effectively suppressed, thereby noticeably reducing noise of a frequency range which is the most critical in total automotive engine noise. Besides, the bearing cap sections are fixedly connected at their side portion by means of the side wall sections and are rigidly connected to the bottom part of the cylinder block skirt section. Therefore, the bearing caps are effectively improved in the strength against the separating movement of the top part of the adjacent bearing caps, and the rigidity of the whole bearing beam structure is greatly improved, thereby effectively lowering the level of the vibration noise emitted from the cylinder block.

What is claimed is:

1. An internal combustion engine comprising:
   a cylinder block including a skirt section, and a plurality of bearing sections integrally connected to said skirt section; and
   a bearing beam structure secured to the bottom part of said cylinder block and including:
   a plurality of main bearing cap sections, each of which associates with one of said cylinder block bearing sections to rotatably support the journal of a crankshaft, each of said main bearing cap sections having along its periphery opposite side portions,
   first and second side wall sections disposed to securely connect said bearing cap sections with each other, said first and second side wall sections being integrally connected respectively to said opposite side portions of each bearing cap section along the periphery thereof and, said first and second side wall sections being connected at their top part with the lower part of said cylinder block skirt section, first and second beam sections disposed to securely connect said main bearing cap sections with each other, said first and second beam sections extending parallel with the axis of the crankshaft and being positioned along respective opposite side portions of each bearing cap section, and first and second beam sections being integrally connected with bottom parts of said first and second side wall sections, respectively, and projecting inwardly from said first and second side wall sections in a manner so that the distance between said first and second beam sections is smaller than that between said first and second side wall sections and the first and second side wall sections are angled so as to converge in a direction towards said beam sections.

2. An internal combustion engine as claimed in claim 1, wherein each of said first and second side wall sections extend along the crankshaft axis from said bearing cap section located in the vicinity of one extremity of said bearing beam structure to said bearing section located in the vicinity of an opposite extremity of said bearing beam structure.

3. An internal combustion engine as claimed in claim 1, wherein each of said first and second side wall sections is provided at its top part with a flange which is securely connected to the bottom part of said cylinder block skirt section, said flange extending along the crankshaft axis.

4. An internal combustion engine as claimed in claim 2, further comprising first and second oil seal installation portions which are formed respectively integrally with said bearing cap sections located in the vicinity of the respective opposite extremities of said bearing beam structure, said oil seal installation portion being for securely carrying an oil seal for the crankshaft.

5. An internal combustion engine as claimed in claim 2, further comprising first and second connecting sections for connecting said first and second side wall sections at their bottom part to form a bearing beam structure frame-like bottom surface which is continuous and integral, said first and second connecting sections being integral with said bearing cap sections, respectively, which are located in the vicinity of the opposite extremities of said bearing beam structure.

6. An internal combustion engine as claimed in claim 5, further comprising an oil pan whose flange is securely connected to said bearing beam structure bottom surface.

7. An internal combustion engine as claimed in claim 6, wherein said bearing beam structure is generally of the shape of an isosceles trapezoid in cross-section, wherein the top part, connected to said cylinder block, of said bearing beam structure is larger in width than the bottom part, connected to said oil pan, of said bearing beam structure.

* * * * *